Dec. 16, 1941.　　H. N. EKBOM ET AL　　2,266,179
TRACTION CONTROL MEANS
Filed Aug. 3, 1940　　4 Sheets-Sheet 1
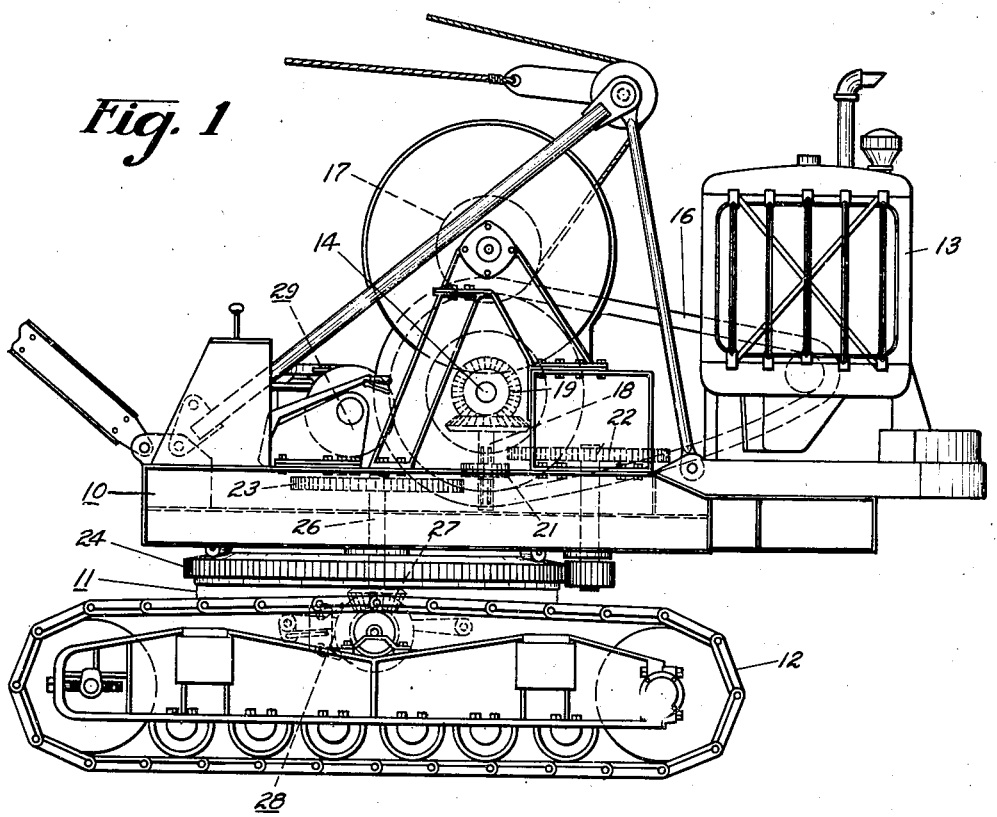
Fig. 1
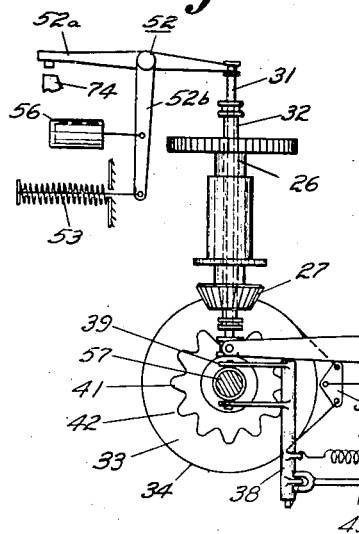
Fig. 10
Fig. 5
INVENTORS
HILMER N. EKBOM
BY　EDWARD KORENSKY
*Flournoy Corey*
ATTORNEY.

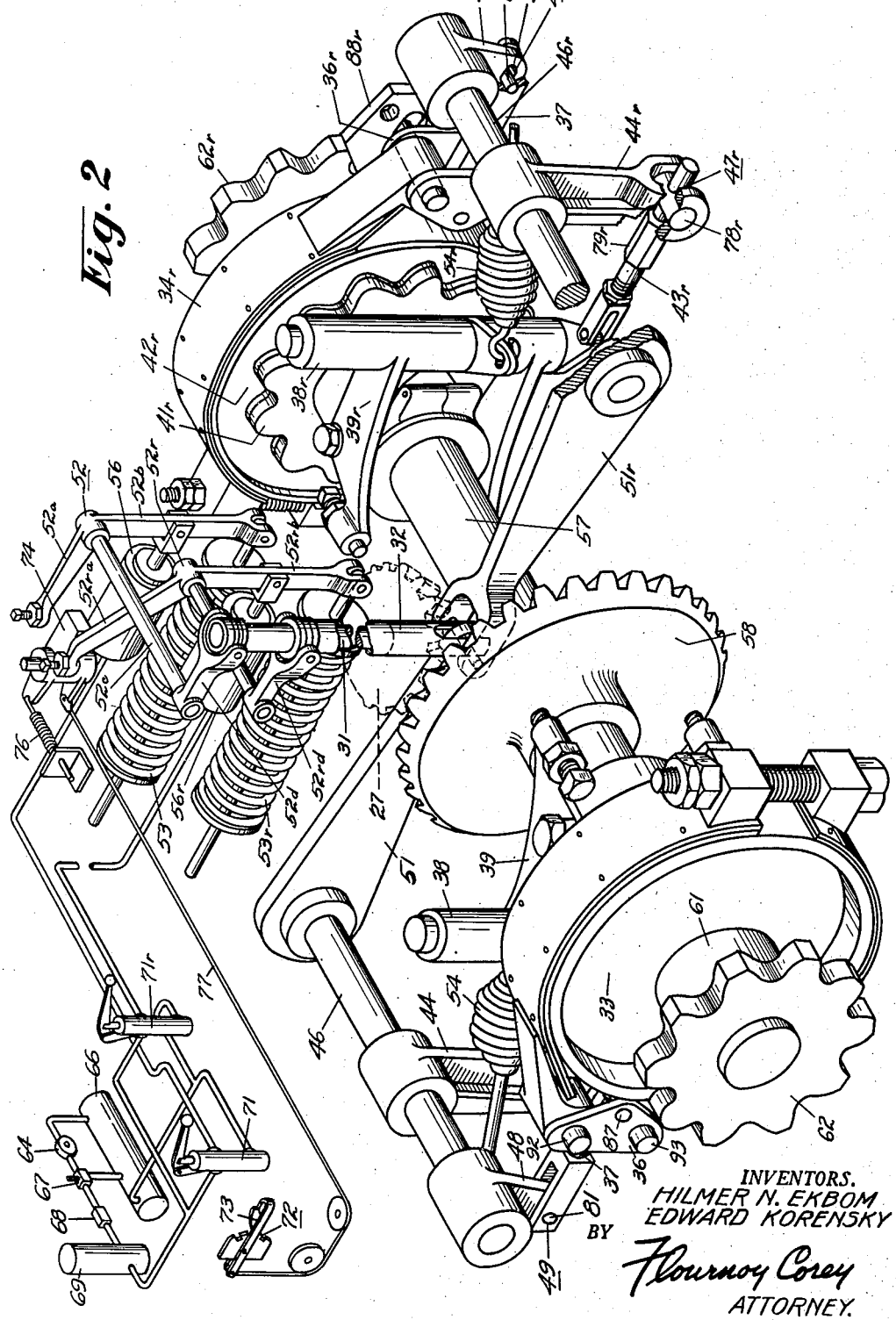

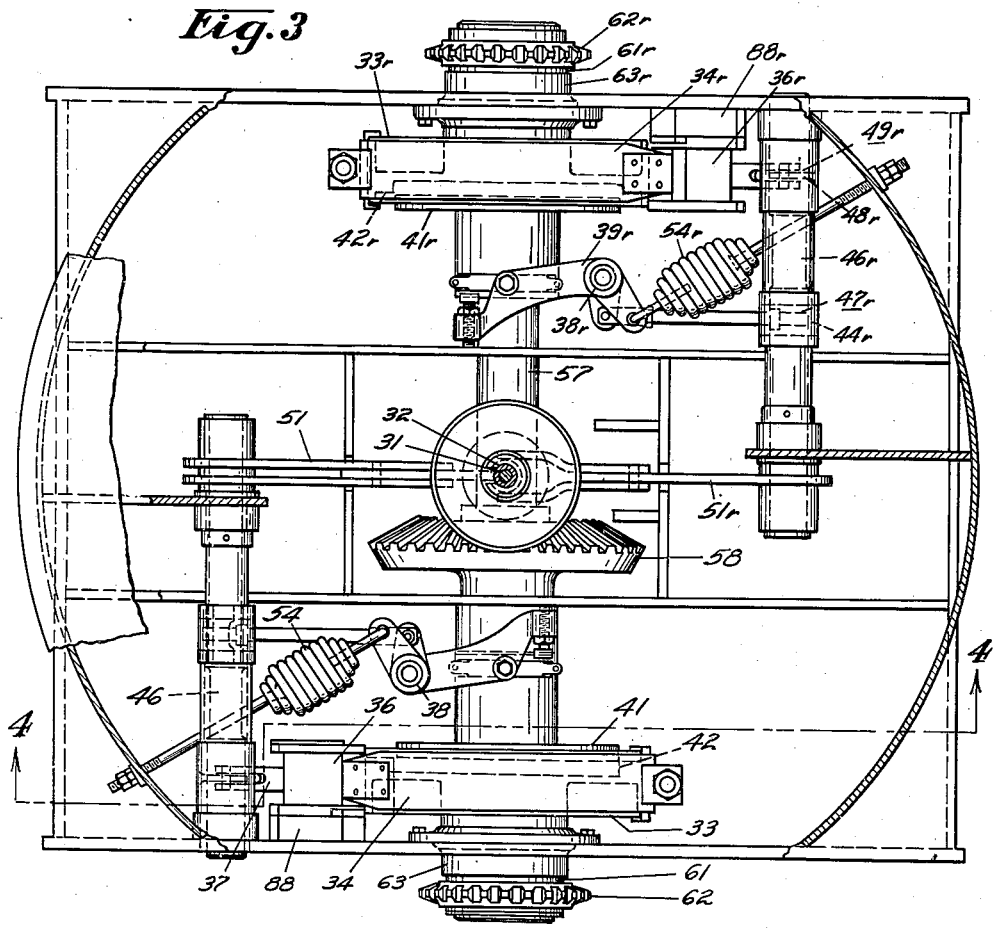
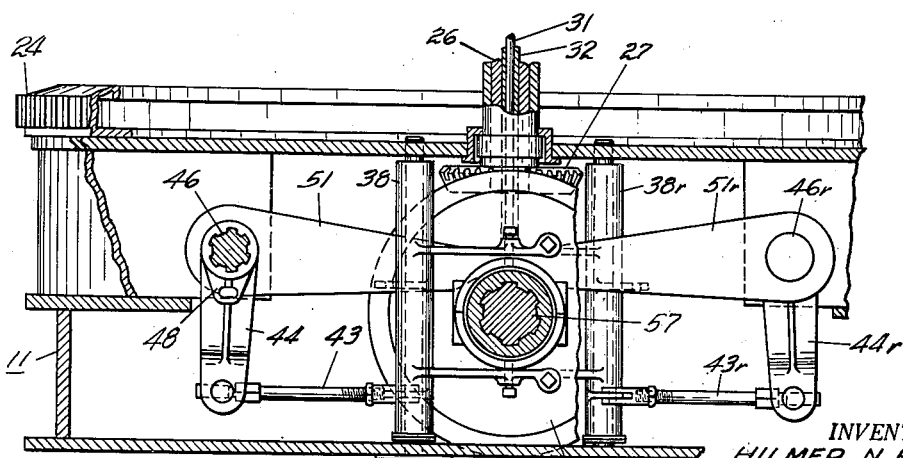

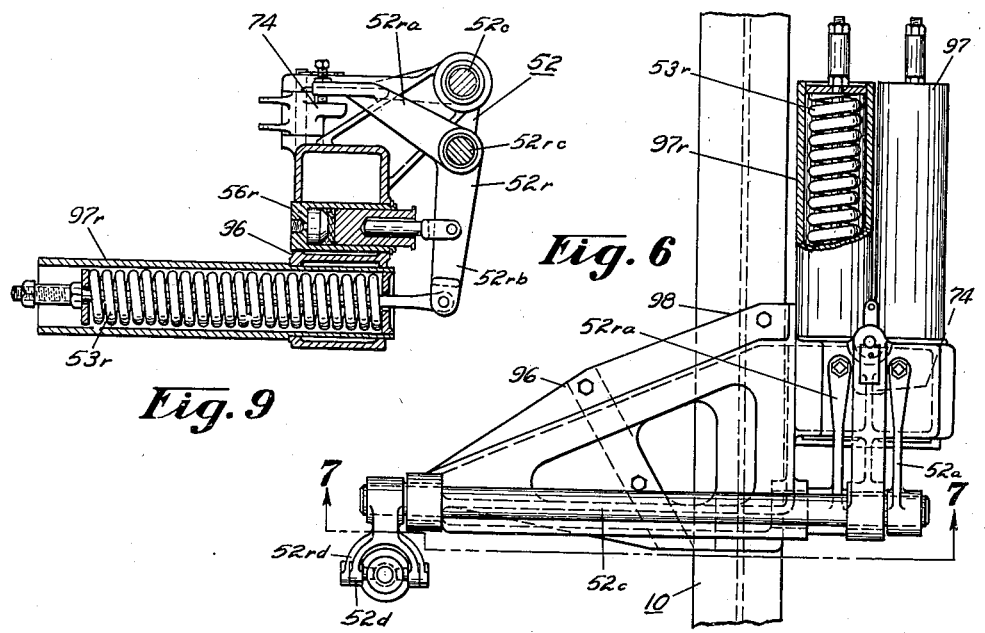
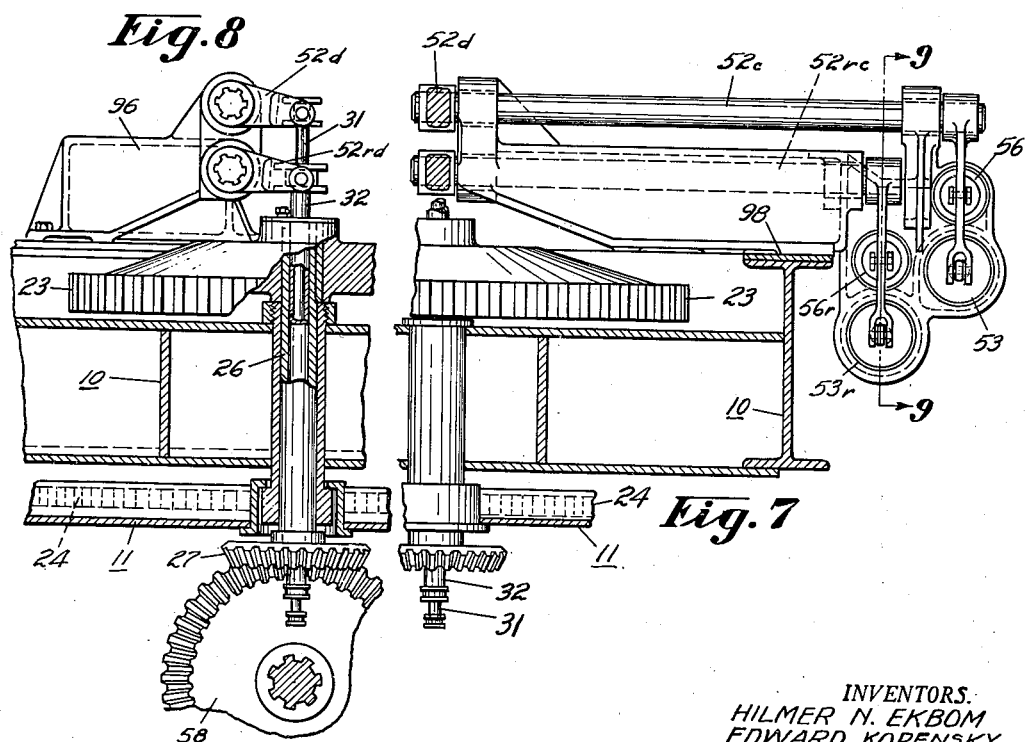

Patented Dec. 16, 1941

2,266,179

UNITED STATES PATENT OFFICE 2,266,179

TRACTION CONTROL MEANS

Hilmer N. Ekbom and Edward Korensky, Cedar Rapids, Iowa, assignors to Link-Belt Speeder Corporation, Chicago, Ill., a corporation of Illinois Application August 3, 1940, Serial No. 350,489

13 Claims. (Cl. 180—9.2)

This invention relates to excavating machinery and the like and has particular relation to steering, braking, and propulsion controlling means applicable to tractors and the mobile bases for such machines.

It is customary, in moving heavy machinery such as cranes, excavating shovels, and earth working machines such as tractors and the like, to employ a pair of multiplanes or continuous treads mounted on a supporting framework which carries the driving motor and the crane, excavating shovel or other equipment. Such machines are usually propelled over the ground by driving means, operated by the motor, which drive the endless treads, and directional control of the movement of the machine over the ground surface is usually secured by disconnecting one of these multiplane treads from the motor and applying a brake to this disconnected tread so that the other or engaged tread is effective to rotate the machine about a vertical axis or pivot it on the disengaged tread to direct its movement in a new direction.

After the machine has been rotated sufficiently to line it up in the desired new direction, the brake is released and the tread again engaged with the motor so the machine may move off in the new direction. If desired, both clutches may be disengaged and the brake applied to hold the machine in any desired position.

There are, however, several disadvantages in the devices of the prior art. In many of these devices, the clutch for driving the endless treads must be disengaged before the brake may be applied. For instance, when the machine is on a hill, the weight of the machine tending to cause the endless treads to revolve may prevent disengagement of the clutch, and thus the brake cannot be applied. This is a material disadvantage of the prior art devices.

It is a general object of our invention to overcome these difficulties and objectionable features of the devices of the prior art and to provide a steering and controlling mechanism in which the brake may be applied by the same control means utilized for engaging and disengaging the clutch without separate or individual disengagement of the clutch and before the clutch has actually become disengaged.

Another object of our invention is to provide an improved steering, controlling and braking means which is very effective in controlling the movement of the machine over the ground, and in which the brake may be applied for braking the machine even if the clutch is engaged, and in which the clutch will be automatically disengaged when the brake is applied and the load on the clutch is released.

Still another object of our invention is to provide means whereby the clutch and brake of either of the endless treads may be disengaged to permit the tread to run free, so that the brake may be employed from zero application to full application on the freed tread to effect a turn of large to small radius as desired.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention In said drawings:

Figure 1 is a view in side elevation of a machine suitable for use with excavation and lifting means, in which a propelling and steering and braking mechanism constructed according to one embodiment of our invention has been incorporated. Some portions of the propelling, steering and braking mechanism are shown in dotted lines to illustrate the relation of these structures with the rest of the machine.

Figure 2 is a view in perspective, with some portions in more or less schematic relation, illustrating the steering and braking mechanism constructed according to one embodiment of our invention, portions of which are illustrated in Figure 1.

Figure 3 is a plan view of the members of the steering, braking and controlling means positioned in the lower or mobile frame of the structure shown in Figures 1 and 2.

Figure 4 is a view in section taken along the lines 4—4 of Figure 3.

Figure 5 is a view in side elevation of one of the braking means shown in Figures 1, 2 and 3.

Figure 6 is a plan view of the spring and hydraulic means used in controlling the clutch and brake operating mechanism.

Figure 7 is a rear elevational view of the mechanism shown in Figure 6 and taken along the lines 7—7 of Figure 6.

Figure 8 is an end view, partly in elevation and partly in section, of the device shown in Figures 5, 6 and 7.

Figure 9 is a view, partly in elevation and partly in section, taken along the line 9—9 of Figure 7, and Figure 10 is a schematic diagram illustrating the operation of a device constructed according to our invention.

Referring now to the drawings, and more particularly to Figure 1 thereof; we have shown, for illustrative purposes, a general view of a typical piece of equipment utilizing a mechanism constructed in accordance with a preferred embodiment of our invention.

In the device shown, an upper or revolving frame 10 is mounted for pivotal or swinging movement about a main, centrally-disposed axis above a lower or mobile frame 11, which frame is mounted for locomotion upon a pair of spaced mutliplane or endless treads 12.

A motor 13, such as a Diesel engine or the like, mounted above the rear end of the upper frame 10, drives a main cross or jack shaft 14 through a belt or chain drive 16. Hoisting drums 17 may be driven from this jack shaft and controlled through manually operable clutches or in any other conventional manner.

A main vertical drive shaft 18 may be driven forwardly or in reverse through selective bevel gearing 19 mounted on the jack shaft 14. A sliding pinion 21 on this vertical drive shaft is adapted to be entirely disengaged or to be selectively engaged with either a swing shaft drive gear 22 or a traction drive gear 23. The swing shaft may extend downwardly through the upper frame and engage with a bull ring 24 above the lower frame, all in accordance with the usual practice in such devices.

The traction drive gear 23 is mounted upon a quill shaft 26 and this shaft is, in turn, mounted for rotation through the axis of rotation of the upper frame on the lower frame. Power for operating the multiplane treads 12 is supplied through a bevel gear 27 mounted on the quill shaft 26, and a train of gear and chain driving members including the braking and clutching mechanism indicated at 28, the general arrangement of which is shown in Figure 10, and which comprises one of the major features of the present invention.

The means, shown in Figures 6 to 9 for actuating and controlling the clutching and braking mechanism is mounted on the upper frame 10, its position being indicated generally at 29 in Figure 1, and push-pull rods 31 and 32 shown in Figure 2, operatively connecting the control means and the braking and clutching mechanism, extend through the hollow center of the quill shaft 26.

Figure 2 shows substantially the complete mechanism illustrating the controlling mechanisms for both multiplanes, while Figure 10 illustrates diagrammatically the control mechanism for only one multiplane. The control and actuating mechanisms are substantial duplicates, except some parts are in reversed position for compactness.

Referring now more particularly to the schematic diagram of Figure 10, a device constructed according to a preferred embodiment of our invention includes the brake drum 33, a brake band 34, a brake band rocker arm 36, and a link 37, the pulling of which will apply the brake band 34 to the drum 33 in either direction of rotation of the brake drum.

A clutch shifter shaft 38 is supplied, the fingers 39 of which are adapted to move the clutch 41 in and out with reference to the female clutch member 42 in the drum 33. The clutch shifter shaft may be rotated by means of the link 43. A lever 44 engaged on the shaft 46 is connected to the link 43 by a lost motion connection 47 to rotate the clutch shifter shaft 38, and thus move the clutch 41 in and out. A shorter lever 48 has lost motion connection 49 with the brake link 37, and rotation of the shaft 46 in a counter-clockwise direction will cause application of the brake band 34 to the drum 33.

Control of the rotation of the shaft 46 is effected by means of the long clutch and brake control lever 51 which is operative by means of push-pull shaft 31. The push-pull shaft 31 is moved up and down by means of the bell crank or clutch-brake operative crank indicated generally at 52. A brake spring 53 will normally tend to move and hold the push-pull shaft 31 down, to thus apply the brake band 34 to the drum 33 and relieve the clutch engaging force, so that the spring 54 may withdraw the male member 41 of the clutch as soon as torque in the clutch is relieved. Movement of the bell crank arm 52 against the compression of the spring 53 is secured by the hydraulic jack 56, to thus move the push-pull rod 31 upwardly, rotate the shaft 46 in clockwise direction, relieve tension on the link 37, disengage the brake 34, and force the clutch into engagement.

It is apparent now that, with the device here shown, the spring 53 will normally exert tension on the link 37 to apply the brake, and that the clutch normally tends to be disengaged by the spring 54, unless the lever 44 is moved to the left to counteract the action of the spring 54 and force the clutch into engagement. The brake may be applied by the spring 53, but the clutch need not disengage until it can move freely out of engagement and the spring 54 can become effective to disengage the clutch.

For a more comprehensive understanding of the mechanism employed, reference may be had to Figure 2 in which both sets of clutches and brakes and the operating mechanism therefor are shown. For convenience the parts shown and numbered in Figure 10 may be considered as the parts shown at the left in Figure 2. The corresponding parts for the other multiplane have been given the same numbers with the letter r added.

Drive of the steer shaft or propulsion shaft 57 is effected through the bevel gears 58 and 27 from the motor of the machine, in accordance with customary practice. The propulsion or steer shaft 57 has the clutches 41 and 41r (see Figure 3) splined on the ends thereof for selective sliding engagement with the female clutch members 42 and 42r. These female clutch members are parts of drums 33 and 33r and the drums are secured on bushings or quill shafts 61 and 61r on which drive sprockets 62 and 62r are mounted. The bushings or quill shafts 61 and 61r may rotate freely on the shaft 57 and also within the journals 63 and 63r.

It is now apparent that an operator, by manipulation of the jacks 56 and 56r, may selectively disengage the brakes and engage the clutches or permit the brakes to engage and the clutches to be disengaged under the actions of springs 53—53r and 54—54r respectively. Any suitable form of pump and valve control means may be utilized for supplying fluid under pressure to the hydraulic jacks and controlling the flow of fluid to and from the hydraulic jacks.

An exemplary arrangement of a hydraulic fluid supply system may include a motor driven positive pressure pump 64 connected to a storage tank 66, a pressure regulating and by-pass valve

67, a check valve 68, a pressure tank or accumulator 69, control valves 71 and 71r, and the necessary conduits.

A neutralizing control, adapted to permit the selective release of a brake without engaging its companion clutch, is illustrated generally at 72, and this control consists of a control lever 73 which may be moved up or down to move the stop 74 to a position beneath one or the other of the arms 52a or 52ra, which are operative extensions of the arms 52b and 52rb respectively. The stop 74 may also be moved to a neutral position, as shown in the drawings, between the two lever arms 52a and 52ra so that the control 72 is ineffective.

If the control lever 73 is moved downwardly, the neutralizing stop member 74 will be swung over beneath the arm 52a by the pull cable 77. Now this cannot be accomplished unless the hydraulic jack 56 has been relieved of pressure so as to permit the spring 53 to pull the arm 52b to the left to raise the arm 52a. This means that, in order to utilize the neutral control 72, the brakes must first be engaged. When, for example, the stop 74 has been swung to a position beneath the lever arm 52a, that lever arm will prevent the jack 56 from moving the left hand clutch and brake throw-out shaft 46 any more than is necessary to disengage the brake. This limited movement of the arm 52a will permit the brake to be disengaged by the jack 56, but the movement is not sufficient to engage the jaw clutch 41. This differential control of the clutch is secured by the lost motion mechanism indicated generally at 47. In the form of lost motion device here shown, the clutch push rod 43 is slidably engaged in the pin 78, and the nut 79 acts as a stop which may be adjusted back and forth on the rod 43 to regulate the amount of lost motion permissible between the stop 79 and the pin 78, which is the amount required to operate the brake without effecting engagement of the clutch.

Movement of the control lever 73 upwardly permits the compression spring 76 to move the stop 74 to a position beneath the lever arm 52ra of the right hand set of clutch and brake controls to permit disengagement of the right hand brake without engagement of the clutch.

The lost motion in the short braking lever 48, indicated at 49 and consisting of the slotted engagement of the lever 48 with a pin 81 on the brake rod 37, is for the purpose of permitting further movement of the clutch engaging means, that is the push rod 43, shaft 38, and fingers 39, so as to fully engage the clutch without causing excessive further releasing movement of the brake band.

The brake structure is illustrated in Figure 5, and consists of brake bands 34 and 34a, adjustment of which is secured by the threaded rod 82 and nuts 83 and 84. The brake pull rod 37, the short braking lever 48, and the shaft 46 are illustrated. The pull rod 37 is pivotally engaged between plates 36 by means of a pin 87. The guide plate 88, fixedly attached to the frame of the vehicle, is provided with slots, indicated at 89 and 91. The slots 89 and 91 receive pins 92 and 93 on the ends of the bands 34 and 34a and these pins are engaged between plates 36. If the brake drum 33 is turning in a clockwise direction, the pin 93 becomes the dead or fixed end, and a pull on the rod 37 will rock the plates 36 to exert a pull on the pin 92 to tighten the brake band on the drum. If the brake drum 33 is rotating in a counter-clockwise direction, the pin 92 becomes the dead end, and the plates 36 will rock in the other direction so as to exert a pull on the pin 93 to apply the brake bands to the drum.

The slot at 94 on the short braking lever 48 permits sufficient travel of the clutch and clutch control members to permit the clutch to become fully engaged, yet the clearances between the bands 34 and 34a and the drum 33 are held at a minimum; the reason for this being that, under conditions of operation, where the movement of the endless tracks is first in one direction and then the other when the brakes are applied, as when an excavating shovel is mounted on the machine in digging position on a hill side, there is a minimum of lost motion and the shock and wear and chattering of the brake bands, on reversal of the drum and as one or the other of the pins 92 and 93 alternately become dead ends, are held to a minimum.

The structural details of the drive mechanism and the braking and clutching members 28, embodied in the lower or mobile frame 11, are shown in more detail in Figures 3 and 4, and the details of the actuating mechanism 29 mounted on the upper frame are shown in Figures 6 to 9 inclusive, in which the bell cranks 52 and 52r, the connected brake engaging springs 53 and 53r, the hydraulic rams 56 and 56r, and the neutralizer stop member 74 are all embodied in one unit.

This actuating unit includes a main frame or casting 96 having openings to receive pairs of hydraulic rams 56 and 56r and to receive casings 97 and 97r for the brake applying springs 53 and 53r. The frame is also provided with bearings for mounting the transverse shafts 52c and 52rc upon which the operating bell cranks are mounted.

The frame 96 of this unit is mounted, as at 98, upon one of the longitudinal beams of the main upper frame 10 in such position as to dispose the lever arm members 52d and 52rd directly above the axis of rotation of the upper frame to permit them to be engaged with the push-pull shafts 31 and 32.

In summation of the main features and characteristics of a device such as we have shown and described, it is apparent that much greater ease and flexibility of operation are afforded and with fewer controls than in devices of the same general character as heretofore constructed. Full control is had over clutching and braking operations. The brakes are normally locked to prevent movement of the machine on its multiplane treads when used as an excavator or the like. This is particularly advantageous when the equipment is digging into a hill or bank.

The brakes may be disengaged individually or at the same time without affecting either clutch. One brake may be disengaged and its companion clutch engaged to drive one tread and cause the entire machine to pivot about the other tread. The brake, connected with the mechanism driving this second tread, may, if desired, be partially or wholly released without engaging its companion clutch, to permit the second tread to run relatively free, and thus permit the machine to swing in a small or large circle rather than pivot about on one tread.

Furthermore, although the clutch and brake, controlling the operation of each multiplane tread, are controlled by a single operating means which may be a hand lever or foot control, the brake may be applied before the clutch is disengaged and even though the clutch fails to disengage promptly due to a continued load.

Each clutch and brake are interconnected in such a manner as to provide a limited amount of independent movement, and one very desirable result of this is that the brakes may be adjusted closely and need never be disengaged to such an extent as to render them loose and invite vibration or chattering.

Although we have described a specific embodiment of our invention, it is apparent that modifications thereof may be made by those skilled in the art. Such modifications may be made without departing from the spirit and scope of our invention as set forth in the appended claims.

We claim as our invention:

1. In a steering and braking mechanism of the class described, a pair of multiplanes, a clutch and brake for each multiplane, means normally tending to apply the brake of each multiplane, means for selectively disengaging the brake and engaging the clutch of either or both multiplanes, and a lost motion connection between the brake and the clutch of each multiplane to permit the brake to be applied with the clutch in engagement.

2. In a propelling, steering and braking mechanism of the class described, a pair of multiplanes, a clutch and brake for each multiplane, brake engaging means normally applying the brakes and permitting disengagement of the clutches of each multiplane, means normally operative to disengage the clutches, brake disengaging means selectively operative to overcome the brake engaging means to release the brakes, and clutch engaging means to engage the clutches operatively connected to and actuated by the brake disengaging means, whereby complete disengagement of the brakes causes engagement of the clutches but engagement of the brakes permits disengagement of the clutches only when torque on the clutches is relieved.

3. In a device of the class described, the combination with a pair of multiplanes and a clutch and brake for each multiplane, of a spring actuated means for normally engaging the brakes, a power means for disengaging the brakes, a means for engaging the clutch operatively connected with a lost motion connection to the power means, whereby complete functioning of the power means disengages the brakes and engages the clutches but whereby partial functioning of the power means disengages the brakes but does not engage the clutch.

4. In a device of the class described, the combination with a pair of multiplanes and a clutch and brake for each multiplane, of a spring actuated means for normally engaging the brakes, a power means for disengaging the brakes, a means for engaging the clutch lost-motion means operatively connecting the said clutch engaging means and said power means, and spring actuated means for disengaging the clutches, whereby the brakes may be applied by the spring actuated means when the power means is inoperative but the clutch need not disengage under the influence of the spring actuated clutch disengaging means until torque on the clutch is relieved.

5. In a steering and braking mechanism for vehicles employing a pair of multiplane treads, driving means including a brake and a clutch member operatively connected with each multiplane, means for normally causing application of the brakes, means for releasing either brake, means operatively connecting each brake with its associated clutch for engaging the clutch, and lost motion means in said connecting means for permitting each brake to be entirely disengaged before its associated clutch is engaged.

6. In a steering and braking mechanism for vehicles employing a pair of multiplane treads, clutch and brake means associated with each tread, means for normally causing application of the brakes, means for selectively disengaging the brakes, means operatively connecting each brake with its associated clutch for causing engagement of the clutch, lost motion means in said connecting means for permitting each brake to be entirely disengaged before its associated clutch is engaged, and other lost motion means in the brake disengaging means for preventing excess disengagement of the brakes during the movement of the clutches while being engaged.

7. In a steering and braking mechanism for vehicles of the class described, a pair of multiplane treads, means including a brake and a clutch for driving each multiplane independently, means for normally applying the brake, means for normally biasing the clutch toward its disengaged position, and means operatively connecting the brake and clutch for permitting the clutch to be disengaged by the biasing means at any time subsequent to release of the brake.

8. In a steering and braking mechanism for vehicles of the class described, a pair of multiplane treads, means including a single manually operable control for effecting clutching and braking operations of each tread independently to effect steering of the vehicle, a brake for each tread, means for operatively connecting one of the brakes to one of the treads and to one of the manual controls, a clutch associated with each brake means for operatively connecting the clutch to the same manual control as the associated brake, and lost motion means in the clutch connecting means whereby the brake may be disengaged to a predetermined degree without affecting the clutch, whereby the clutch may be engaged by further movement of the manual control means and whereby the brake may be reapplied independently of the position of the clutch.

9. In a steering and braking control mechanism for vehicles of the type employing a pair of endless multiplane treads, driving means including a brake and clutch associated with each tread, means for normally applying the brakes, control means for selectively disengaging the brakes, means for subsequently engaging the clutch associated with the disengaged brake, and means for selectively rendering the control means inoperative relative to the clutches.

10. A steering and braking control mechanism for vehicles of the type employing a pair of endless multiplane treads, clutch and brake means operatively connected with each tread, spring means for normally causing the brakes to be applied, hydraulic means associated with the spring means for counteracting the force of the springs for selectively disengaging the brakes, means operatively connected with the hydraulic means for engaging the clutches subsequent to disengagement of the brakes, and means for selectively limiting the effective movement of the hydraulic means whereby at least one of the brakes may be disengaged without affecting its associated clutch.

11. In a steering and braking mechanism for a vehicle having a lower frame and a pair of endless treads mounted thereon, a transverse power shaft, means for driving the power shaft, driven means including a brake mounted for free rotation near each outer end of the transverse shaft, clutch means, splined to the shaft and engageable to drive the driven means, means for driving the endless treads from the driven means, a brake and clutch operative shaft, means including a lever arm on the shaft and a connecting member for releasing the brake upon a partial rotation of the shaft, means including a clutch lever arm on the brake and clutch operative shaft, and a connecting member having lost motion connection with said clutch lever arm for causing engagement of the clutch subsequent to release of the brake, said lost motion connection further adapted to permit re-engagement of the brake independent of the clutch, and separate spring means for biasing the clutch toward disengaged position.

12. In a steering and braking control mechanism for vehicles of the type employing a pair of endless multiple treads, a traction drive shaft disposed transversely between the multiple treads, a co-operating brake and clutch structure adjacent each end of the transverse traction shaft, the braking members being freely rotatable upon the said transverse shafts, an upper frame rotatably disposed above the endless treads, driving means extending upwardly through the center of rotation of the upper frame and operatively connected with said clutch member, a clutch yoke operatively connected with each clutch member, spring means for normally holding said clutch members in disengaged position, a clutch and brake operating shaft for each clutch and brake structure, a pair of lever arms on each of said operating shafts, link means operatively connecting one of said lever arms with the clutch yoke and the other of said lever arms with the brake, lost motion means in the link connecting the clutch yoke and its operative lever arm, rod and tube members disposed co-axially at the center of rotation of the upper frame, lever arms connecting said rod and tube members at their lower ends with the brake and clutch operative shafts, lever arms disposed upon the upper frame of the vehicle and operatively connected with said rod and tube members at their upper ends, spring means for normally biasing said upper lever members in one direction, and hydraulic jack means selectively operable to bias said upper lever members in the opposite direction against the action of said springs.

13. In a device of the character described including a lower frame and spaced, multiplane treads for supporting said lower frame, a traction shaft mounted transversely between the multiplane treads, driving means including a sleeve freely rotatable upon the traction shaft, said sleeve including a brake drum, a clutch element rotatable with the traction drive shaft and engageable with the said driving means, a pivotally mounted clutch fork, spring means operatively connected with the said clutch fork to normally bias said clutch to its disengaged position, a clutch and brake operative shaft having a clutch operating lever and a brake operating lever secured thereto, link means operatively connecting the clutch fork and the said clutch operating lever, a brake band cooperative with each brake drum, a connecting member having pinned and pivotal connection with the ends of said brake band, a connecting link pivotally connected to the said connecting member at a point between the pinned connections to the ends of the brake band, said connecting link being connected at its other end to the brake operating lever, and a guide plate having guide slots therein for slidably receiving the ends of the pins of the said pinned connections.

HILMER N. EKBOM.
EDWARD KORENSKY.